United States Patent [19]
Lindstrom

[11] Patent Number: 5,568,938
[45] Date of Patent: Oct. 29, 1996

[54] AIR-BAG ARRANGEMENT

[75] Inventor: Martin Lindstrom, Stenkullen, Sweden

[73] Assignee: General Engineering (Netherlands) BV, Utrecht, Netherlands

[21] Appl. No.: 133,386

[22] Filed: Oct. 8, 1993

[30] Foreign Application Priority Data

Oct. 9, 1992 [EP] European Pat. Off. ............. 92309219

[51] Int. Cl.⁶ ................................................. B60R 21/20
[52] U.S. Cl. .................................... 280/743.2; 280/743.1
[58] Field of Search ............................. 280/743.2, 743.1, 280/742, 728 R

[56] References Cited

U.S. PATENT DOCUMENTS

| | | | |
|---|---|---|---|
| 3,810,654 | 5/1974 | DeBano, Jr. et al. | 280/743 R |
| 3,879,056 | 4/1975 | Kawashima et al. | 280/743 A |
| 4,003,588 | 1/1977 | Oka et al. | 280/743 R |
| 4,944,529 | 7/1990 | Backhaus | 280/743 R |
| 5,004,266 | 4/1991 | Miller et al. | 280/743 A |
| 5,022,675 | 6/1991 | Zelenak, Jr. et al. | 280/743 R |
| 5,048,863 | 9/1991 | Henseler et al. | 280/743 R |
| 5,180,188 | 1/1993 | Frantz et al. | 280/740 |
| 5,249,825 | 10/1993 | Gordon et al. | 280/743 A |

FOREIGN PATENT DOCUMENTS

| | | | |
|---|---|---|---|
| 0344422A3 | 12/1989 | European Pat. Off. . | |
| 0479185 | 4/1992 | European Pat. Off. | 280/743 A |
| 4142326 | 6/1993 | Germany | 280/743 R |
| 0136942 | 6/1991 | Japan | 280/743 R |
| 0136947 | 6/1991 | Japan | 280/743.7 |
| 4176751 | 6/1992 | Japan | 280/743 A |

Primary Examiner—Christopher P. Ellis
Attorney, Agent, or Firm—Spencer & Frank

[57] ABSTRACT

An inflatable bag to protect a driver or passenger in a motor vehicle is provided with one or more tear elements which do not form part of the bag defining the boundary between the interior of the bag and the exterior of the bag. The tear elements initially limit the interior volume of the bag but, tear as the bag is inflated, thus increasing the permissible interior volume of the bag.

16 Claims, 3 Drawing Sheets

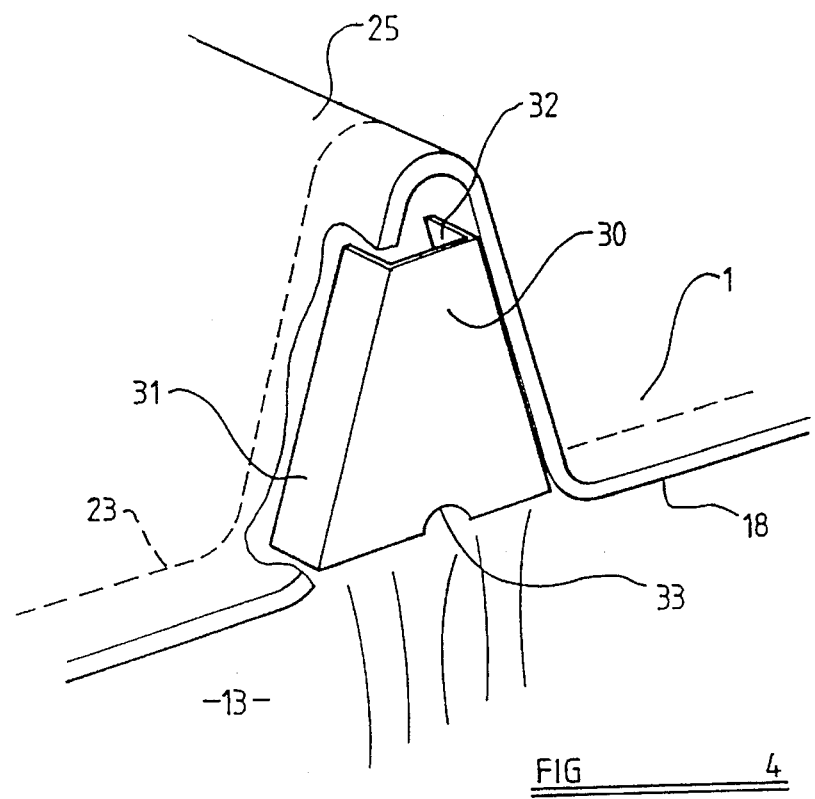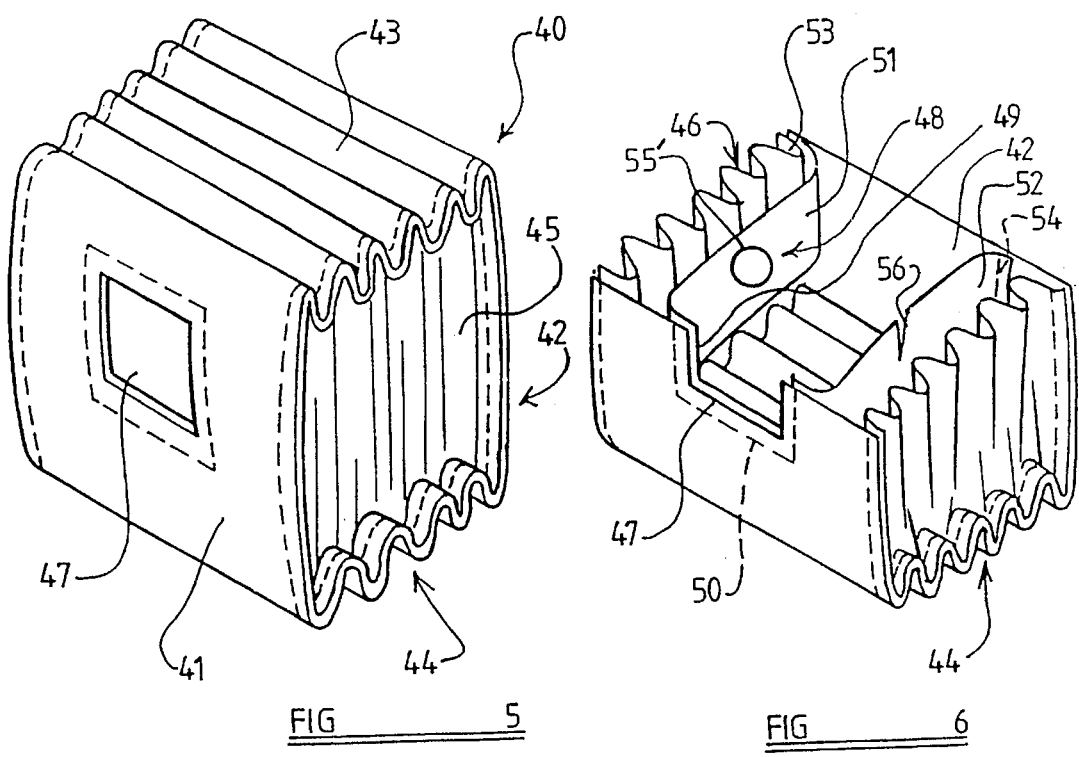

AIR-BAG ARRANGEMENT

BACKGROUND OF THE INVENTION

The present invention relates to an air-bag arrangement, and more particularly relates to an air-bag arrangement adapted to protect a driver or passenger in a motor vehicle such as a motor car.

It has been proposed to provide an air-bag in a motor car positioned in front of the driver or in front of a passenger of the motor car, the bag being adapted to inflate in the event that an accident arises. The bag thus provides a "cushion" for the driver or the passenger.

The design of air-bags is nor very sophisticated and the bag is adapted to be inflated before the driver or passenger moves forwardly within the motor vehicle during an accident as a result of vehicle retardation.

Reference may be made to EP-A-0344422 which discloses a bag in which parts of the bag are folded together to form a "tuck" by stitching, the stitching forming a "tear seam". The main purpose of this is to control the way that the bag is inflated. Thus the "tear seam" effectively controls the speed of inflation or the direction in which the bag expands during inflation so that the bag, when it is inflated, does not hit the driver or passenger with a significant force. The "tear seam" is designed to tear or rip, enabling the "tuck" to open out at a predetermined instant during the inflation of the bag thus effectively increasing the permissible interior volume of the bag at that instant.

One disadvantage of the system of EP-A-0344422 is that the "tear seam" comprises stitching which passes through part of the bag and which forms the boundary between the interior of the bag and the exterior of the bag. When the "tear seam" tears or rips, either the thread forming the stitching can break or the fabric in the region of the seam can tear. It is possible that the fabric will tear along the line of the stitching, since the fabric will have been pierced by the needle when the stitches have been put in place, and the fabric may thus have been punctured or weakened in the line of the stitching. However, it is also possible that the fabric adjacent the actual stitching may tear or rip. In any event, it is quit possible that the fabric of the bag may become damaged. If the fabric of the bag is damaged, and is apertured, the bag may deflate in an undesirable manner, and the bag will then not provide the desired cushioning effect.

SUMMARY OF THE INVENTION

The present invention seeks to provide an improved air-bag arrangement.

According to this invention there is provided an inflatable bag adapted to protect a driver or passenger in a motor vehicle, wherein the bag is provided with one or more tearable means comprising at least one element provided with an area of weakness at which the element is designed to tear, the tearable means being so located that when the bag is exposed to an internal pressure in excess of a predetermined pressure, the tearable means tear and control the way the bag is inflated, the interior volume of the bag being greater when the tearable means have torn than before the tearable means have torn.

Thus, when the bag is inflated and the tearable means tear, the integrity of the bag is not affected, and the bag remains substantially air-tight.

Preferable the tearable means comprise one or more elements of fabric each provided with a notch or recess, or aperture to define said area of weakness at which tearing across the fabric can occur.

The tearable means may comprise fabric that is formed integrally with the fabric forming the bag or may comprise separate elements which are secured to the fabric forming the bag.

The fabric of the tearable means may be flame-retardant fabric.

Conveniently the fabric of the tearable means is secured to the fabric defining the air-bag at a position surrounding an aperture formed in the material forming the air-bag intended to provide an inlet for gas from a gas generator.

In one arrangement one or both ends of each tearable means is secured to the bag by a seam provided to hold areas or components of the bag together, but alternatively one or both ends of the tearable means is secured to the fabric forming the bag by a seam which serves the sole purpose of securing the tearable means to the fabric of the bag.

In one embodiment the or each tearable means extends across a tuck formed in the bag, but alternatively the or each tearable means extends across parts of the bag which are of "concertina" form (in the uninflated state).

In one arrangement the or each tearable means is on the exterior of the bag, but alternatively the or each tearable means is on the interior of the bag.

BRIEF DESCRIPTION OF THE DRAWINGS

In order that the invention may be more readily understood, and so that further features thereof may be appreciated, the invention will now be described, by way of example, with reference to the accompanying drawings in which FIG. 4 is a perspective view with parts cut away of an alternative embodiment of the invention, FIG. 5 is a perspective view of yet another embodiment of the invention, and FIG. 6 is a view corresponding to FIG. 5 but with parts out away to illustrate the operative parts of the invention.

DESCRIPTION OF THE PREFERRED EMBODIMENTS

Figure 1:
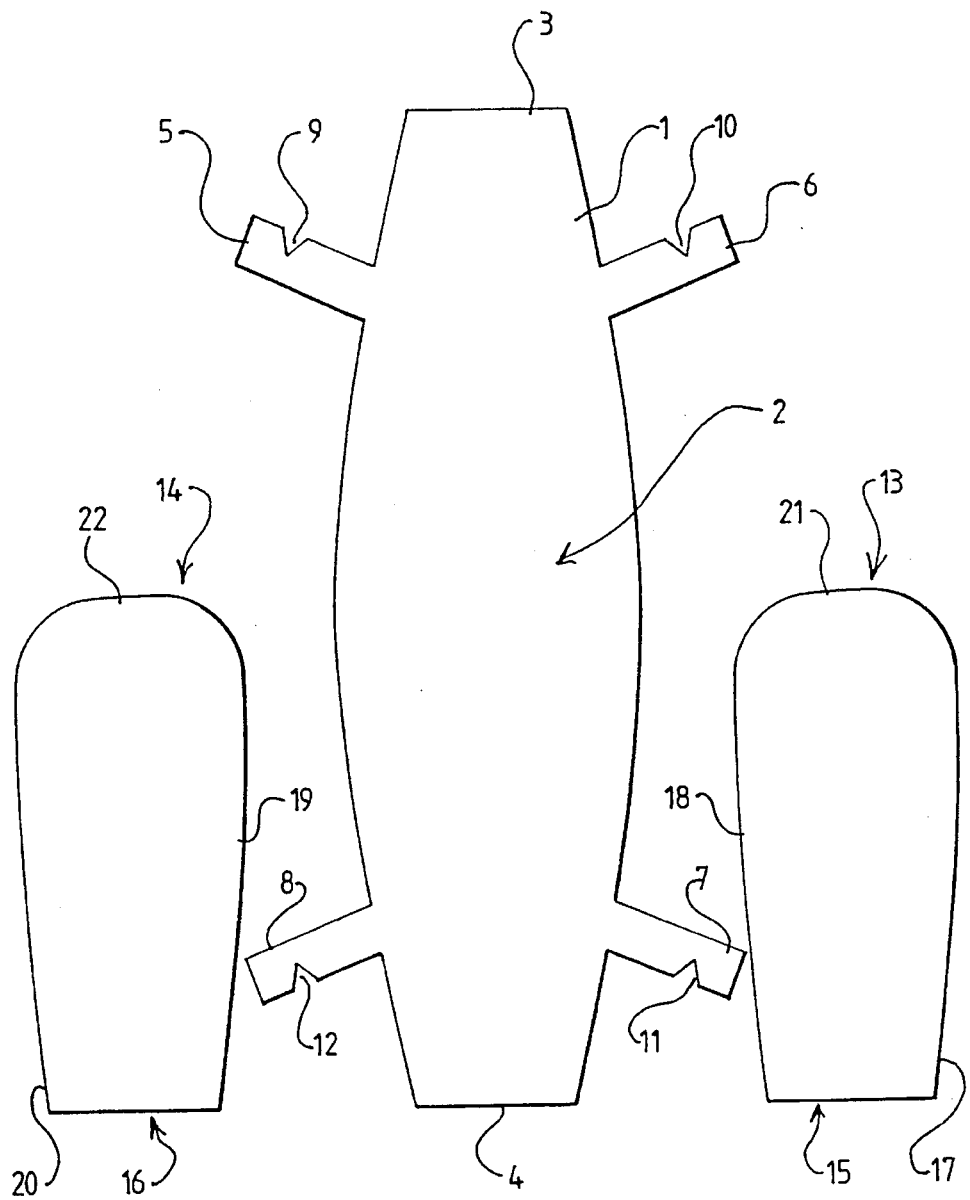
FIG. 1 is a plan view of the component "blanks" used in constructing a bag in accordance with the invention.

Referring initially to FIG. 1 the component parts of an air-bag are illustrated. The components comprise a first or central component 1 formed of fabric or an appropriate fabric laminate, the component 1 being of elongate form and having a central region 2 which is of greater width than the widths of the ends 3, 4.

At positions intermediate the central region 2 and each end, the component 1 is provided with four substantially symmetrically located projecting tabs 5,6,7,8 which extend outwardly from the edges of the component, each of rectangular form and each formed integrally with the component 1. Each tab is provided, in one long side thereof, with a substantially "V"-shaped notch 9,10,11,12.

FIG. 1 illustrates two further 13,14 each of the same form. The components 13,14 may be formed of the same fabric or laminate as the component 1. Each component 13,14 is of elongate form, having a length approximately half the length of the component 1. Each component 13,14 has a relatively narrow end 15,16 and an opposite, wider end 21,22 and has diverging side edges 17,18,19,20 extending from a larger end 21,22 to the narrow end 15,16.

Figure 2:
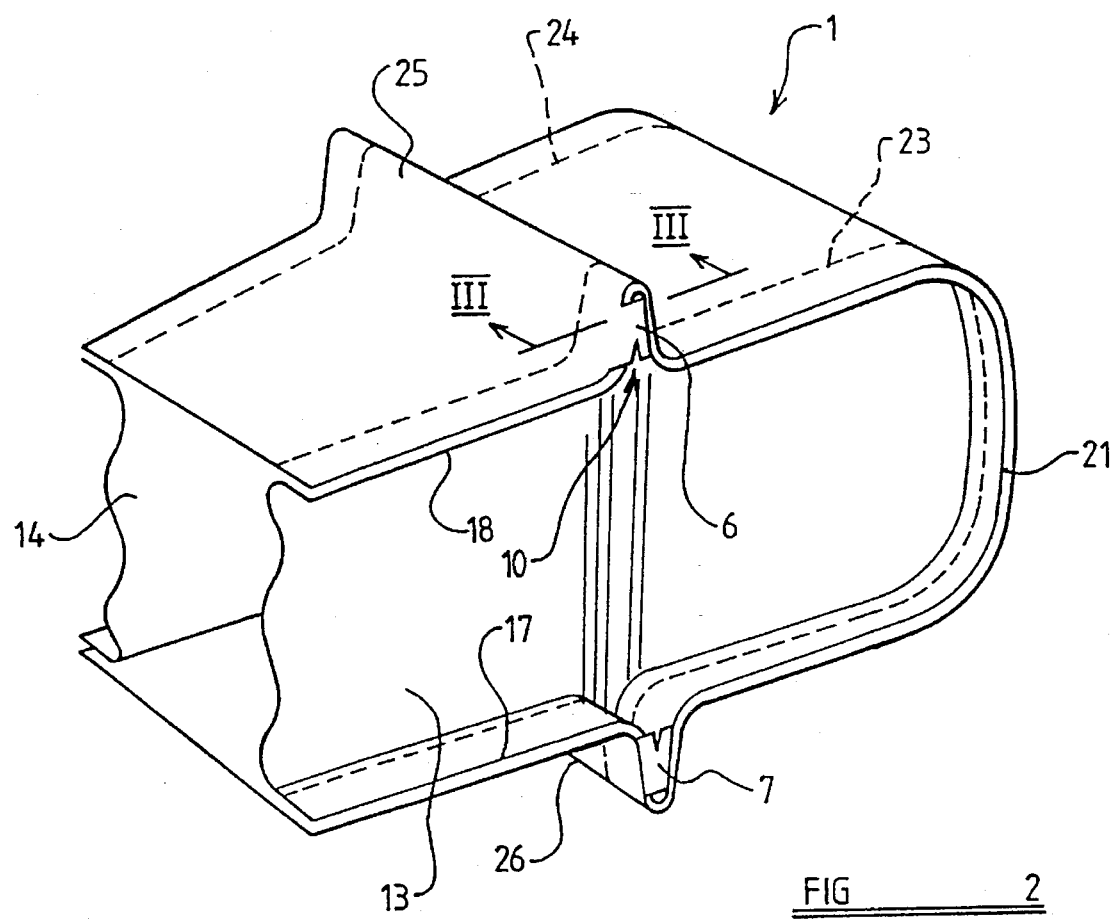
FIG. 2 is a perspective view of the bag made from the components of FIG. 1.

The components of FIG. 1 may be assembled to form an air-bag having the general configuration shown in FIG. 2. It is to be observed that the main component 1 is folded to have a substantially "U"-shaped form, to form, in the orientation illustrated, the bottom, end and top of an air-bag, and the components 13 and 14 are located in position to form the side walls of the air-bag.

The side edges 17,18 and the end 21 of the component 13 are aligned with one edge of the component 1 and stitched in position by means of stitching 23. The component 14 is placed in position in a similar way and is retained by stitching 24.

At this stage of fabrication the bag has the four tabs 5,6,7 and 8 projecting outwardly.

Subsequently two "tucks" 25,26 are formed on opposite sides of the bag, in the region of the tabs 5,6,7,8. As can be seen most clearly by considering FIG. 2 and FIG. 3, the tab 6 extends from one side of the tuck across the tuck 25, and is stitched, by means of stitching 27 to the component 13 and the main component 1 on the opposite side of the tuck, such stitching being through the border region of components 13 and adjacent the edges thereof. Thus, the tab 6 has one end formed integrally with the main component 1 and has the other end stitched to the main component 1, the tab extending across the tuck 25. It can be seen that each of the tabs 5,6,7 and 8 is stitched in position in this way.

The tabs serve to retain the tucks 25,26 in position, thus limiting the total volume of the interior of the air-bag.

It is to be appreciated, however, that when the air-bag is inflated, when the air-bag reaches an inflated condition as illustrated in FIG. 2, a significant force will be applied to the tabs 5,6,7,8 and the tabs 5,6,7,8 will tear transversely, the tears being aligned with the notch 9,10,11,12 provided in the tabs. The notch is, of course, provided for this very purpose and ensures that the tab tears at a position which is substantially central between the two ends of the tab, that is to say the end formed integrally with the main component 1 and the end that is stitched to the main component 1. Thus each notch serves to define an area of less width, and thus of relative weakness, at which the tab is designed to tear. The strength of the fabric between the end of the V notch and the other side of the tab determines the force needed to make the tab tear. The amount of the fabric between the end of the V notch and the other side of the tab determines the elongation which the tab will undergo due to tearing, before the tab breaks. Different tabs may be designed to tear at different forces to control the inflation of the bag. As the tabs tear, the tucks 25,26 are released, thus increasing the maximum permissible volume of the bag. It is to be observed that the tabs 5,6,7,8 do not form any part of the bag that constitutes the boundary between the interior of the bag and the exterior of the bag. Thus, any damage effected to the tabs 5,6,7,8 does not in any way influence the integrity of the bag.

It is thus to be appreciated that by providing tear tabs of the type described above, the inflation of the air-bag may be controlled without any risk of the integrity of the air-bag being damaged.

Figure 3:
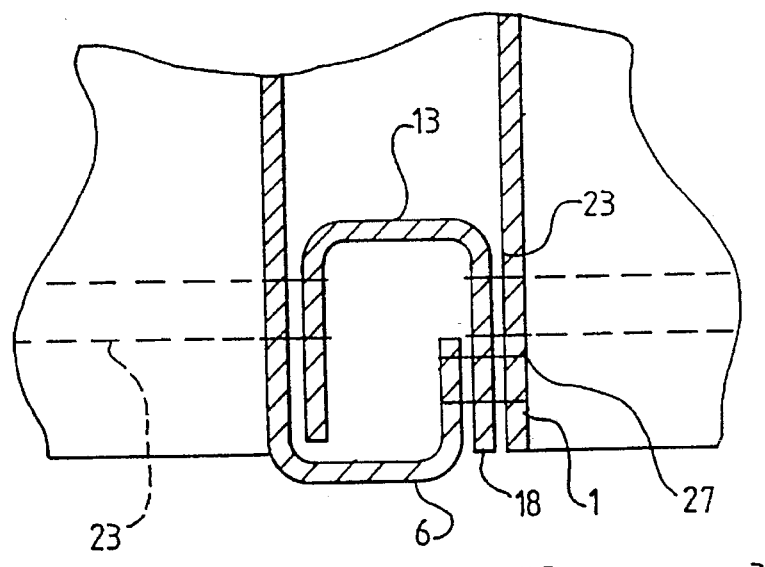
FIG. 3 is a sectional view taken on the line III—III of FIG. 2.

FIG. 4 illustrated an embodiment of the invention which is very similar to that of FIGS. 1 to 3. Like reference refer to like parts which will not be re-described. In the embodiment of FIG. 4, however, a tear tab 30 is provided which is totally separate from the main components of the bag. The tear tab 30 comprises a substantially triangular shaped element of fabric, which may be a fabric completely different from the fabric forming the components 1, 13 and 14 of the air-bag. When the tear tab is located on the outside of the bag, the fabric of the tear tab 30 will not be exposed to hot gas within the interior of the air-bag, and can thus be selected purely for its physical or "tearing" properties rather than its heat-resisting properties. In the arrangement shown in FIG. 4, the tear tab 30 is provided with two rearwardly folded flaps 31,32 which are stitched to regions adjacent the edge 18 of the component 13 on opposite sides of a tuck 25. The stitching will, of course, also pass through the edge region of the main component 1 in the vicinity of the tuck. The stitching may be stitching provided solely for the purpose of holding the tab 30 in position, or may comprise the stitching 23 provided primarily to secure the main component 1 and the components 13.

The tear tab 30 is provided with a notch or recess 33 in its lower edge provided to form an initiating point for a tear. The air-bag of the embodiment of FIG. 4 will operate in the same way as the air-bag of the embodiment of FIGS. 1 to 3.

Turning now to FIGS. 5 and 6, a further embodiment of the invention is illustrated.

In this embodiment of the invention an air-bag 40 is provided having a front wall 41, a rear wall 42 interconnected by upper and lower walls 43,44 of "concertina" form (i.e., before air-bag 40 is fully inflated). Side walls 45,46 are stitched in position, the side walls also being of substantially "concertina" form.

An aperture 47 is formed in the front wall 41 to constitute an inlet for gas from a gas generator.

An element 48 is provided within the air-bag, the element 48 being formed of a flame-proof or heat-resistant material. The element 48 defines an aperture 49 which is co-aligned with the aperture 47 provided in the front wall 41. The element 48 is stitched to the front wall 41 by stitching 50 which surrounds the apertures 47,49. The portion of the element 48 surrounding the aperture 49 serves to protect the front wall 41 of the air-bag from heat and flame from the gas generator during inflation of the air-bag.

The element 48 is provided with two elements 51,52 which extend to the rear wall 42 of the bag. In order to illustrate two alternative constructions, in FIG. 6 the elements 51,52 are shown as being secured in different ways at their ends remote from front wall 41, but it will be appreciated that normally one or the other of these two ways of securing the elements will be used for both elements 51,52. In the drawing, however, the element 51 is shown as having its terminal region stitched to the rear wall 42 by stitching 53 which is the stitching which secures the side wall 46 to the rear wall 42. The element 52, however, is shown as having its terminal region stitched to the rear wall 42 by stitching 54 which serves the sole purpose of securing the end of the rearwardly extending portion 52 to the rear wall 42.

It is to be noted that the rearwardly extending element 51 defines, at a substantially central position, a transversely extending (or alternatively, a transversely extending oval aperture) 55 slit a similar slit 56 (or oval aperture) is provided in the rearwardly extending portion 52. The apertures 55' or slits which can be, for example, a notch or recess 56 serve to define a weakened area of the respective element 51,52 at which each element is designed to tear.

It can be seen that the rearwardly extending element 51 and the rearwardly extending element 52 each effectively form a tear tab, being an element which initially restricts the amount of inflation of the air-bag but which, by tearing, permits a fuller inflation of the air-bag.

It will be appreciated that whilst, for purposes of illustration, the bags shown in the drawings are shown as having the free edges of the fabric presented to the exterior, in practice it will frequently be desired to have the bags shown effectively turned inside out, so that the free edges of the fabric are concealed within, and the bag, when inflated, presents a relatively smooth exterior. In such an arrangement, of course, it may not be practicable to have the tearable elements on the exterior of the bag.

Whilst the invention has been described with reference to embodiments in which the bag is made of different components of fabric which are stitched together, it is to be appreciated that an embodiment of the invention may be constituted by a bag formed from one single element of fabric or manufactured in one weaving process.

I claim:

1. An inflatable bag adapted to protect a driver or passenger in a motor vehicle, wherein the bag is provided with one or more tearable means comprising at least one fabric element provided with at least one of a notch, recess and aperture to define an area of weakness at which the fabric element is designed to tear, the tearable means being so located that when the bag is exposed to an internal pressure in excess of a predetermined pressure, the tearable means gradually tear and control the way the bag is inflated, the interior volume of the bag being greater when the tearable means have torn than before the tearable means have torn.

2. A bag according to claim 1 wherein the fabric element is formed integrally with the bag.

3. A bag according to claim 1 wherein the fabric element comprises separate fabric elements which are secured to the bag.

4. A bag according to claim 1 wherein the fabric element is flame-retardant.

5. A bag according to claim 4 wherein the fabric element of the tearable means is secured to the inflatable bag at a position surrounding an aperture formed in the material forming the bag, said aperture being intended to provide an inlet for gas from a gas generator.

6. A bag according to claim 1 wherein one or both ends of said one or more tearable means is secured to the bag by stitching provided to hold areas or components of the bag together.

7. A bag according to claim 1 wherein one or both ends of said one or more tearable means is secured to the bag by stitching which serves the sole purpose of securing the tearable means to the fabric of the bag.

8. A bag according to claim 1 wherein said one or more tearable means extends across a tuck formed in the bag.

9. A bag according to claim 1 wherein said one or more tearable means extends across parts of the bag which are of concertina form.

10. A bag according to claim 1 wherein said one or more tearable means is on the exterior of the bag.

11. A bag according to claim 1 wherein said one or more tearable means is on the interior of the bag.

12. An inflatable bag adapted to protect a driver or passenger in a vehicle wherein the bag comprises:

a front wall defining an aperture to constitute an inlet for gas from a gas generator;

a rear wall;

means for inter-connecting the front wall and the rear wall;

a fabric element secured to the front wall and defining an aperture which is co-aligned with the aperture provided in the front wall, the element being provided with portions which extend to the rear wall of the bag and which are secured to the rear wall of the bag, each of the portions being provided with at least one of a notch, recess and aperture to define an area of weakness at which the portion is designed to tear, the inflatable bag being such that when the bag is exposed to an internal pressure in excess of a predetermined pressure, the portions gradually tear and control the way the bag is inflated, the interior volume of the bag being greater when the portions have torn than before the portions have torn.

13. An inflatable bag as defined in claim 12, wherein the element comprises a flame-proof material.

14. An inflatable bag as defined in claim 12, wherein the element comprises a heat resistant material.

15. An inflatable bag as defined in claim 12, wherein the portions are secured to the rear wall of the bag by stitching.

16. A device for protecting a person in a motor vehicle, comprising:

an inflatable bag formed by two oppositely located side walls, a top wall and a bottom wall, said bag having an uninflated condition wherein the bag has a concertina configuration arranged around a perimeter of the bag and formed in each of the walls; and a fabric element fixedly attached to the inflatable bag in a region of the concertina configuration, and having one of a notch and an aperture to define an area of weakness at which the fabric element is designed to tear, the fabric element gradually tearing at one of the notch and the aperture in a predetermined manner into two pieces when the bag is inflated for controlling the inflation of the bag.

* * * * *